Sept. 7, 1937.    L. F. WOODRUFF    2,092,544
DEVICE FOR DECODING RECORDS
Filed Aug. 7, 1936    3 Sheets-Sheet 1
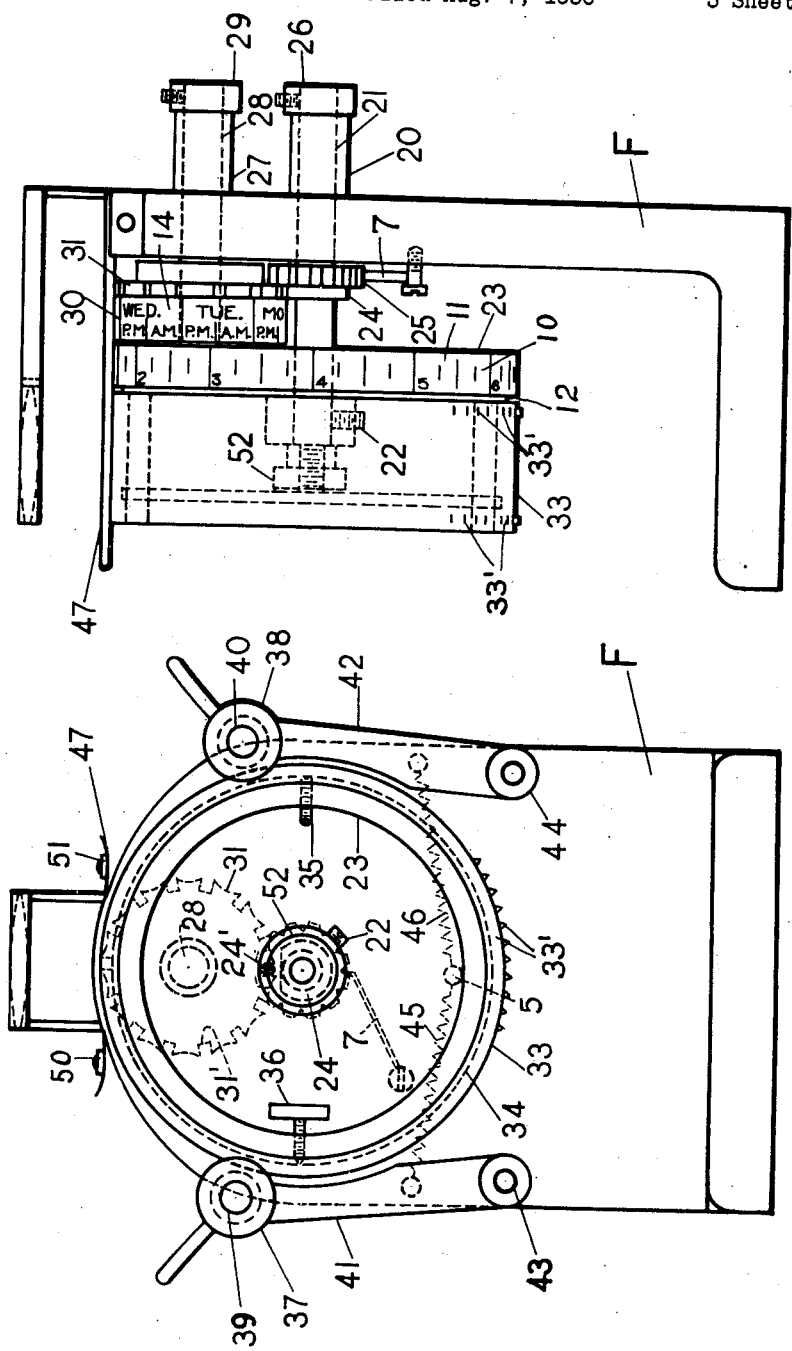
INVENTOR.
Louis F. Woodruff,
BY Dike, Calver - Gray.
ATTORNEYS Sept. 7, 1937.　　　　　L. F. WOODRUFF　　　　　2,092,544
DEVICE FOR DECODING RECORDS
Filed Aug. 7, 1936　　　3 Sheets-Sheet 2
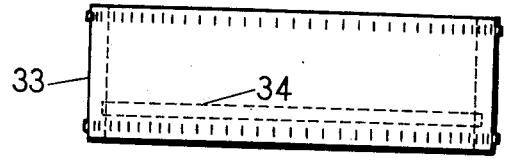
FIG. 6
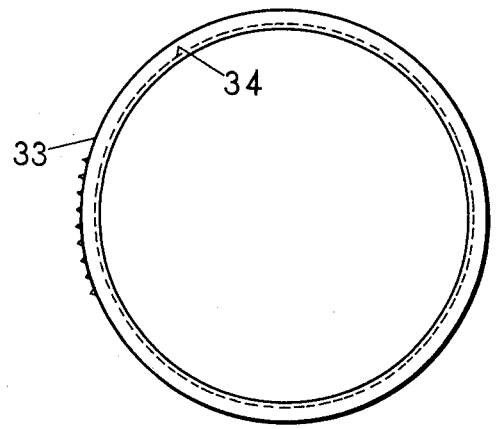
FIG. 5
FIG. 7
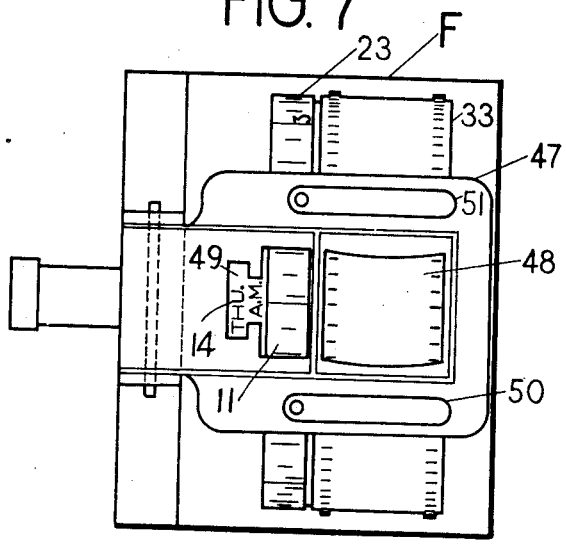
FIG. 3
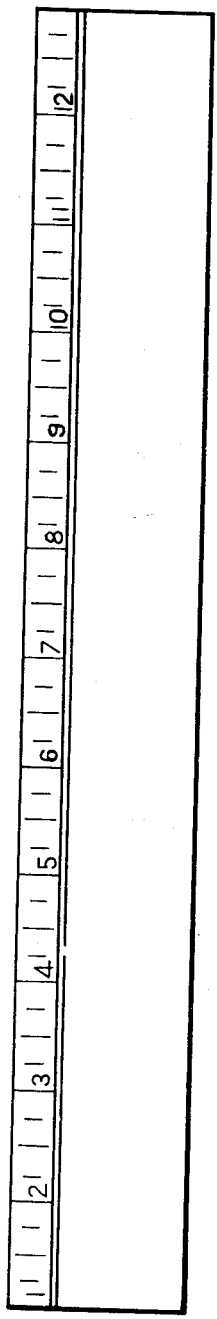
FIG. 4
INVENTOR.
Louis F. Woodruff
BY Dike, Calver & Gray
ATTORNEYS.

Sept. 7, 1937.  L. F. WOODRUFF  2,092,544
DEVICE FOR DECODING RECORDS
Filed Aug. 7, 1936  3 Sheets-Sheet 3

INVENTOR.
Louis F. Woodruff.
BY Dike, Calver & Gray.
ATTORNEYS.

Patented Sept. 7, 1937

2,092,544

UNITED STATES PATENT OFFICE 2,092,544

DEVICE FOR DECODING RECORDS

Louis F. Woodruff, Belmont, Mass.

Application August 7, 1936, Serial No. 94,811

5 Claims. (Cl. 33—129)

The present invention has to do with graphic records which have been made by recording devices to record the conditions of operation of an apparatus or process over a desired period of time. In such recording devices, a record tape is moved at a desired rate while markings are formed on the tape representative of the conditions of operation. Such record tapes have been provided with pre-printed scale calibrations representative of time intervals and conditions of operation. The printing of such scale calibrations is expensive and some of this expense is a total loss because of waste of record tape which often cannot be avoided. Furthermore, the use of such printed record tape requires great care and accuracy and consequent loss of time in initially setting the tape in the recording device in order to avoid possibility of error.

It is an object of the present invention to avoid the difficulties incident to the use of such printed record tape and to provide a device making possible the use of unprinted record tape and the accurate interpretation and reading of records formed thereon.

In general, the device of the invention comprises movable carriers for moving the record tape and a time scale having representations of time units so arranged and operatively connected that they may be moved in such timed relation that predetermined time units and the scales are brought successively adjacent a stationary calibrated scale at the same time as corresponding points on the record tape which are spaced a distance equal to the distance of travel of the tape in such represented time during the making of the record on the tape. The record tape is marked to indicate the point thereon and time at which its movement in the recording device was commenced. This point on the tape is initially set in the device of the invention opposite the corresponding time representation on the time scale.

The invention will be more clearly understood from the following description in conjunction with the accompanying drawings: in which, Fig. 1 is a front elevational view of a device embodying the invention;

Fig. 2 is a side elevational view of the same with certain parts omitted;

Fig. 3 is a plan view of the same with certain parts omitted;

Figs. 4 and 5 are developments of certain parts of the device;

Fig. 6 is a side elevational view of one of the parts of the device;

Fig. 7 is a front elevational view of the part shown in Fig. 6;

Figure 8:
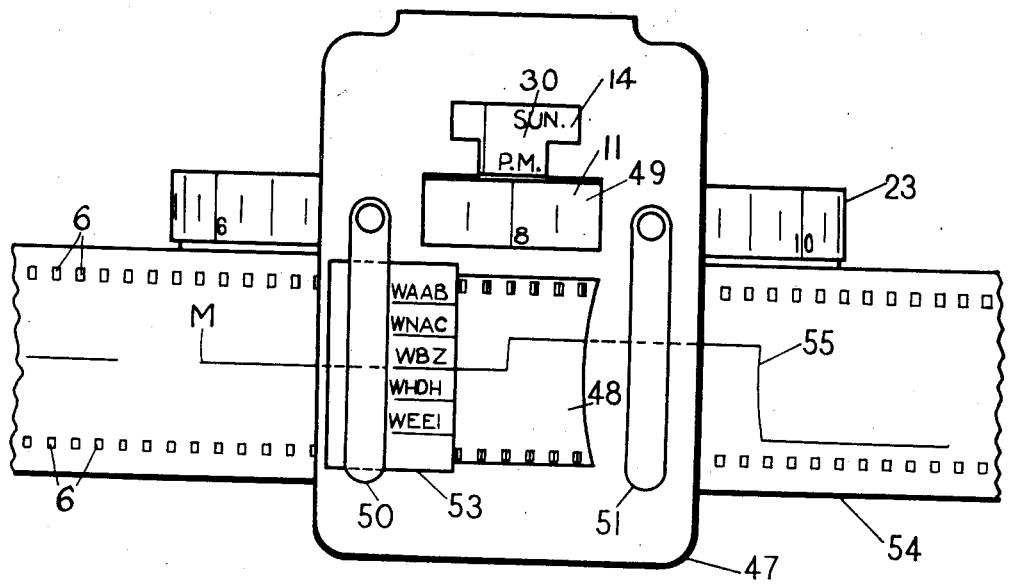
Fig. 8 is an enlarged detail plan view of the machine with certain parts omitted.
Figure 9:
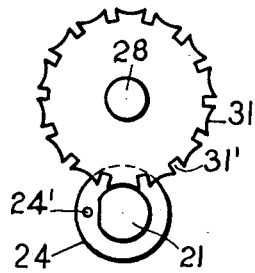
Fig. 9 is a detail front elevational view of certain parts of the device.
Figure 10:
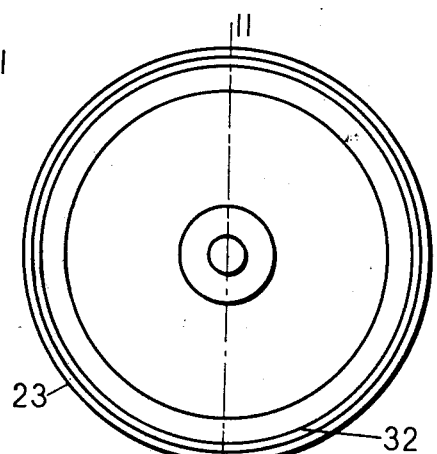
Fig. 10 is a front elevational view of one of the parts of the device.
Figure 11:
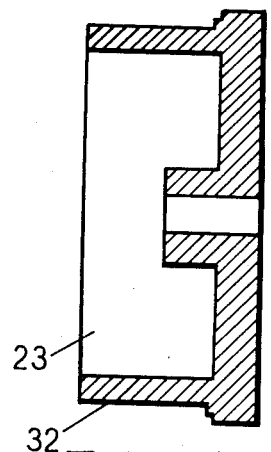
Fig. 11 is a sectional view taken substantially on the line 11—11, Fig. 10.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

One embodiment of the invention is illustrated in the accompanying drawings and comprises a frame F having a bearing 20 in which a shaft 21 is rotatably mounted. A collar 26 fixed upon the shaft 21 abutting the bearing 20 serves to prevent axial movement of the shaft. The forward end of the shaft 21 is provided with a thumb nut 52 to permit manual operation of the shaft. The frame F is also provided with a bearing 27 in which a shaft 28 is mounted for rotation. A collar 29 is fixed upon the shaft 28 adjacent the bearing 27 and serves to prevent axial movement of the shaft. A Geneva pinion 24 is fixed upon the shaft 21 and is provided with a pin 24' adapted to engage notches 31' in a Geneva gear 31 fixed upon the shaft 28. A stop ratchet 25 is fixed upon the shaft 21 so that it may be engaged by the free end of a leaf spring 7 carried by the frame F.

A wheel 23 is fixed upon the shaft 21 by a set screw 22. The raised portion 10 of the periphery of the wheel 23 is provided with a scale 11 having representations of time units, or sub-units, such as hours and minutes. A sprocket shell 33 is mounted on the portion 12 of the periphery of the wheel 23 and is provided with a groove 34 to receive a guide pin 35 carried by the wheel 23 whereby the position of the sprocket shell may be adjusted. The sprocket shell 33 is held in its adjusted position by a set screw 36 carried by the wheel 23. Teeth 33' are provided at each edge of the sprocket shell adapted to engage perforations 6 near the opposite longitudinal edges of a record tape 54. Rolls 37 and 38 are carried upon stub shafts 39 and 40 on arms 41 and 42 which are pivotally mounted on studs 43 and 44 carried by the frame F. The rolls 37 and 38 are held in engagement with the record tape 54 to assure mesh of the apertures 6 of the latter with the teeth 33' of the sprocket shell 33 by springs 45 and 46 which are connected at one end to a pin 5 on the frame F and at their other ends to the arms 41 and 42 respectively. A wheel 30 is fixed upon the shaft 28 so that its top is adjacent the top of the wheel 23. The periphery of the wheel 30 is provided with a time scale 14 having units of time representation, such as days of the week sub-divided into P. M., and A. M.

The frame F is provided with a shelf 47 extending forwardly over the wheels 30 and 23, the shelf 47 being provided with an opening 48 directly over the sprocket shell 33 and an opening 49 directly over the scales 11 and 14 on the wheels 23 and 30, respectively. Spring clips 50 and 51 are provided on the shelf 47 for holding a calibration slip 53 adjacent the opening 48 and extending transversely of the record tape 54.

The record tape 54 bears a record line 55 formed thereon in a device, such as that described in a co-pending application of Robert F. Elder and Louis F. Woodruff Serial No. 96,350 filed August 17, 1936 for recording the radio listening habits of users of radio receiving sets. In that device the record tape 54 is caused to travel at a uniform desired rate at all times and the device is provided with a stylus which is brought in engagement with the record tape 54 each time the radio receiving set is tuned to a broadcasting station. The position of a given point on the record line 55 transverse of the record tape 54 depends upon the broadcasting station at which the radio receiving set was tuned at the particular time. The record tape 54 is provided also with a marking M together with the time and date which indicates the point under the stylus on the record tape at the time the record tape started its motion in the device in the radio receiving set.

In the device of the present invention the calibration slip 53 is provided with markings which indicate the transverse positions on the record tape which correspond to particular broadcasting stations. In using the device of the invention the record tape 54 is threaded upon the sprocket shell 33 so that the point M will be positioned adjacent the calibration slip 53 and opposite the time representation on the scales 11 and 14 corresponding to the time the record on the record tape was started. The record tape 54 may be fed through the device by turning the shaft 21. The Geneva movement comprising the Geneva pinion 24 and gear 31 are constructed so that for each revolution of the shaft 21, the shaft 28 carrying the scale 14 will be moved one fourteenth of a revolution or an amount corresponding to one position on the scale 14. The device, of course, will be adjusted so that as the time representation 12 on the scale 11 passes adjacent the calibration slip 53, the scale 14 will be moved an amount corresponding to one position thereon, for example, from A. M. to P. M. As the record tape 54 is drawn slowly through the device a clerk can readily decipher the record. Referring to Fig. 8, the record line 55 on the tape 54 indicates that from about 6 P. M. on Sunday until 8 P. M. the radio set was tuned to station WBZ and at 8 P. M. it was tuned to WNAC where it remained until about 9:30 P. M.

What I claim is:

1. A device for facilitating the reading of records on a record tape comprising a stationary scale, a carrier for moving a record tape, the said scale being disposed transversely relative to the path of movement of said tape, a movable time scale having representations of time units, and means operable for moving said carrier and time scale in such timed relation that said units of time representation are brought successively adjacent said stationary scale at the same time as corresponding points on said record tape which are spaced a distance equal to the distance of travel of the tape in such represented time during the making of the record on the tape.

2. A device for facilitating the reading of records on a record tape comprising a stationary scale, a carrier for moving a record tape, the said scale being disposed transversely relative to the path of movement of said tape, a movable time scale having representations of time units, a movable time scale having representations of time sub-units, and means operable for moving said carrier and said time scales in such timed relation that predetermined sub-units of time representation are brought successively adjacent said stationary scale at the same time as corresponding points on the record tape which are spaced a distance equal to the distance of travel of the tape in such represented time during the making of the record on the tape and so that predetermined units of time representation are brought periodically adjacent said stationary scale at time intervals corresponding to a predetermined number of said sub-units of time representation.

3. A device for facilitating the reading of records on a record tape comprising a stationary scale, a rotatable carrier for moving a record tape, the said scale being disposed transversely relative to the path of movement of said tape, a wheel carrying a time scale having representations of time units, and means operable for rotating said carrier and wheel in such timed relation that said units of time representation are brought successively adjacent said stationary scale at the same time as corresponding points on said record tape which are spaced a distance equal to the distance of travel of the tape in such represented time during the making of the record on the tape.

4. A device for facilitating the reading of records on a record tape comprising a stationary scale, a rotatable carrier for moving a record tape, the said scale being disposed transversely relative to the path of movement of said tape, a wheel carrying a time scale having representations of time units, a wheel carrying a time scale having representations of sub-units of time, and means operable for rotating said carrier and said wheels in such timed relation that predetermined sub-units of time representation are brought successively adjacent said stationary scale at the same time as corresponding points on the record tape which are spaced a distance equal to the distance of travel of the tape in such represented time during the making of the record on the tape and so that predetermined units of time representation are brought periodically adjacent said stationary scale at time intervals corresponding to a predetermined number of said sub-units of time representation.

5. A device for facilitating the reading of records on a record tape comprising a stationary scale, a carrier for moving a record tape, the said scale being disposed transversely relative to the path of movement of said tape, a movable time scale having representations of time units, means operable for moving said carrier and time scale in such timed relation that said units of time representation are brought successively adjacent said stationary scale at the same time as corresponding points on said record tape which are spaced a distance equal to the distance of travel of the tape in such represented time during the making of the record on the tape, and means for adjusting the position of said carrier relative to said time scale to bring a given point on said record tape opposite a given time representation on said time scale.

LOUIS F. WOODRUFF.